US010241796B2

(12) United States Patent
Jung

(10) Patent No.: US 10,241,796 B2
(45) Date of Patent: Mar. 26, 2019

(54) COMPILER-ASSISTED LOOKAHEAD (CAL) MEMORY SYSTEM APPARATUS FOR MICROPROCESSORS

(71) Applicant: Yong-Kyu Jung, Fairview, PA (US)

(72) Inventor: Yong-Kyu Jung, Fairview, PA (US)

(73) Assignee: Yong-Kyu Jung, Erie, PA (US)

(*) Notice: Subject to any disclaimer, the term of this patent is extended or adjusted under 35 U.S.C. 154(b) by 245 days.

(21) Appl. No.: 15/431,605

(22) Filed: Feb. 13, 2017

(65) Prior Publication Data

US 2018/0232232 A1    Aug. 16, 2018

(51) Int. Cl.
*G06F 9/30* (2018.01)
*G06F 9/38* (2018.01)
*G06F 12/0875* (2016.01)
*G06F 12/0897* (2016.01)

(52) U.S. Cl.
CPC .......... *G06F 9/3804* (2013.01); *G06F 9/3004* (2013.01); *G06F 9/3016* (2013.01); *G06F 9/30058* (2013.01); *G06F 9/3855* (2013.01); *G06F 12/0875* (2013.01); *G06F 12/0897* (2013.01); *G06F 2212/452* (2013.01)

(58) Field of Classification Search
CPC ............. G06F 12/0875; G06F 12/0897; G06F 2212/452; G06F 9/3016; G06F 9/3804

USPC .................................................. 717/100–178
See application file for complete search history.

(56) References Cited

U.S. PATENT DOCUMENTS

| | | | | |
|---|---|---|---|---|
| 6,185,675 | B1* | 2/2001 | Kranich | G06F 9/3804 |
| | | | | 711/125 |
| 6,256,727 | B1* | 7/2001 | McDonald | G06F 9/3804 |
| | | | | 712/205 |
| 8,910,112 | B2* | 12/2014 | Li | G06F 9/541 |
| | | | | 709/227 |
| 2011/0153308 | A1* | 6/2011 | Koh | G06F 9/45516 |
| | | | | 703/26 |
| 2012/0004920 | A1* | 1/2012 | Kelly | G10L 19/018 |
| | | | | 704/500 |

* cited by examiner

*Primary Examiner* — Jae U Jeon
*Assistant Examiner* — Noor Alkhateeb

(57) ABSTRACT

A compiler-assisted lookahead (CAL) memory system for a CAL microprocessor consisting of a CAL memory management unit, a CAL lookahead instruction (LI) and compatible instruction (CI) memory system, and a CAL LI and CI cache system, is designed for operating with a CAL frontend processor to fetch LIs and CIs in a lookahead manner and to reorder the LIs/CIs fetched before decoding them for producing compatible results of the program. The invention is for enhancing performance and energy-efficiency of loop operations by reusing the LIs and CIs in the loops without fetching them iteratively from the CAL memory system.

17 Claims, 3 Drawing Sheets

COMPILER-ASSISTED LOOKAHEAD (CAL) MEMORY SYSTEM APPARATUS FOR MICROPROCESSORS

TECHNICAL FILED OF THE DISCLOSURE

The invention relates creating a single or plurality of compiler-assisted lookahead (CAL) memory systems for concurrently and/or sequentially accessing instructions in two different categories from a single or plurality of memories and caches, where the instructions in the two different categories are the instructions in a lookahead instruction (LI) category and in an associated compatible instruction (CI) category.

An LI represents a basic block, wherein the basic block is a straight-line code sequence (1) with only branch in to the entry and only branch out at the exit, (2) without any branch to the entry and only branch out at the exit, and (3) without any branch to the entry and out at the exit.

An LI can be a branch instruction at the exit of the basic block. The other instructions in the same basic block are all CIs. Therefore, a basic block consists of an LI and the other CIs. In addition, a part of the basic block can be represented by a pair of an LI and a single or plurality of CIs. This instruction-level transformation can be performed by the basic block compiler (BBC) during the compilation. Consequently, the generated LIs and CIs are not obfuscated but inherently provide lookahead capability for a frontend processor integrated to a backend processor with the invented CAL memory system, where the backend processor typically comprises of a single or plurality of the pipelines, including execution engines, such as arithmetic logic units (ALUs), multipliers, and so on.

More specifically, the invention relates identifying various functions of the LIs from the basic blocks found from the program compiled in prior arts. The functions of the LIs identified include for (1) providing control flow of the basic blocks in the program; (2) providing a single or plurality of initial addresses of the CIs of the associated LIs; (3) delivering any LI needed to predict the branch of the LI to a branch predictor; (4) determining whether or not a single or plurality of LIs accessed from the LI caches is fetched to a frontend processor, where the frontend processor typically comprises of an instruction fetcher, a branch predictor, an instruction decoder, and other hardware units in a multi-stage pipeline; (5) providing compatible information encoded for producing the same results of the instructions compiled without the BBC compilation; and (6) stopping and restarting of the CI fetch before and after disrupted operations, where the disrupted operations include a branch miss prediction, an exception, an interrupt, and the other abnormal operations found in prior arts.

The invention relates delivering necessary LIs and all of the associated CIs to a single or plurality of the instruction fetchers integrated to a single or plurality of the instruction decoders in a lookahead instruction fetch manner, where the lookahead instruction fetch is to fetch an LI before fetching the single or plurality of the associated CIs in sequential or parallel. Therefore, the LI, which needs to be predicted a branch by a branch predictor, is fetched even before fetching the associated CIs unlikely others in prior arts. Consequently, a plurality of branch prediction latencies found in prior arts can be hidden in order to enhance the performance of a processor.

The invention relates delivering necessary LIs and all of the associated CIs to the backend processor in the compatible order via the single or plurality of the instruction decoders integrated to the backend processor by reordering the fetched LIs and the associated CIs. Thereby, the backend processor produces the same execution results within fewer the operational cycles of the backend processor than the cycles taken by the same backend processor without the invented CAL memory system.

The invention relates prefetching and fetching a single or plurality of LIs and the associated CIs from the LI and CI memory system comprising independently accessible LI and CI main memories and a single or plurality levels of LI and CI caches, such as level 2 and/or level 1 (L2/L1) LI caches and CI caches. A single or plurality of LIs is accessed from the single or plurality of the LI main memories prior to access a single or plurality of CIs from the single or plurality CI main memories. Similarly, the single or plurality of LIs and CIs read are written to a single or plurality of LI caches and CI caches, respectively. More specifically, accessing order of instructions from other memory systems found in prior arts is different from the accessing order of LIs and the associated CIs. However, delivering order of the LIs and CIs to a single or plurality of the instruction decoders in the frontend processor is compatible to produce the same execution results with the same backend processor found in prior arts.

The invention relates accessing an LI located in the LI main memory and/or the LI caches by providing an address of the next LI to the LI main memory and/or the LI caches after (1) decoding the currently accessed LI, (2) receiving an address of the taken-branch path of the LI, or (3) obtaining an address of the next LI on the fall-through path, where the taken-branch path starts from a location of the next LI if the current LI takes a branch and the fall-through path starts from a location of the next LI if the current LI does not take a branch. More specifically, a plurality of LIs is accessed from the LI main memory and/or the LI caches in parallel to access the more CIs in parallel for the superscalar and speculatively operating backend processors.

The invention relates accessing a single or plurality of CIs from the CI main memory and/or the CI caches by providing a single or plurality of the first CI addresses of the associated CIs obtained after decoding of the single or plurality of LIs. A single or plurality of the remaining CIs of the LIs is accessed from the consecutive addresses of the CI main memory and/or the CI caches without providing any addresses of the remaining CIs. Therefore, time and energy consumption of the CI main memory and/or the CI caches are reduced. In addition, fetching a single or plurality of unnecessary CIs to the frontend processor is prevented unlike a plurality of the instructions fetched are not used but discarded from the frontend processors in prior arts.

The invention relates performing a lookahead branch prediction by delivering a single or plurality of the LIs representing conditional branches to the branch predictor for predicting a single or plurality of the next LI addresses while the associated CIs are fetching concurrently if necessary. Some of the LIs are not fetched to the branch predictor if the LIs do not represent conditional branches. The LIs delivered to the branch predictor are reordered with the associated CIs fetched before delivered to the instruction decoder. More specifically, the LI and the associated CIs fetched as a loop do not fetched from the CAL memory system again. Instead, the LI stored in the branch predictor and the CI information blocks stored in the CI fetch queue are iteratively used for branch prediction and reorder operation until the loop is exited. This loop fetch operation is performed without supplementing the complex loop buffers and the large trace buffers used in prior arts while the CAL memory system is completely shut down for saving energy if necessary.

BACKGROUND OF THE DISCLOSURE

The present invention generally relates transforming each basic block in the program compiled in prior arts to a pair of an LI and a single or plurality of CIs during the compilation with the BBC. However, some LIs are not required to have any associated CI. The invention also relates identifying the various LIs according to the types of the basic blocks, including (1) basic blocks with conditional branches, (2) basic blocks of subroutines, (3) basic blocks with unconditional branches, (4) instruction segments without any flow control, where the instruction segment is a sequence of instructions, and (5) the other single or plurality of consecutive instructions in the program.

The invention relates prefetching and fetching a single or plurality of the LIs and the associated CIs in different order from the order of instructions in the basic block found in prior arts. Thereby, the invention allows performing lookahead branch prediction by prefetching and fetching the LIs in a sequential or parallel manner before doing the associated CIs. More specifically, the lookahead branch prediction relates hiding the branch prediction latency and reducing the instruction fetch cycle.

The invented CAL memory system includes the BBC to transform the basic blocks in the program found in prior arts. In addition, the BBC creates a pair of an LI and the associated single or plurality of CIs from a basic block. More specifically, the pair of the LI and the associated CIs is created from a loop or a subroutine. The pair of the LI and the associated CIs permits to prefetch and fetch in a lookahead manner, which the LI of a conditional branch at the end of the basic block is prefetched and fetched prior to do the associated CIs transformed from the remaining instructions located prior to the last instruction in the same basic block. A single or plurality of LIs and the associated CIs are allocated to the LI and CI main memories for sequential and/or concurrent prefetching and/or fetching via separate paths of the LI and CI main memories and caches.

The BBC creates an LI comprising an opcode to identify type of the LI, the encoded branch target address, the compatible information, including the last CI identifier of the associated CIs, the loop identifier, and/or other information for prefetching and fetching the next LI and the associated CIs.

The invented CAL memory system apparatus is designed for reducing the deliver cycles of the necessary LIs and the associated CIs by hiding the accessing latencies of the LI caches and hiding the branch prediction latencies of the LIs. Thereby, the overall performance of the processors is enhanced. The invented CAL memory system is designed for performing a lookahead prefetching and fetching with the associated prefetchers and fetchers.

The invented CAL memory system apparatus prefetches and/or fetches a single or plurality of LIs and/or CIs concurrently for branch prediction of the LIs and/or for decoding the CIs. More specifically, the CAL memory system apparatus reorders the fetched LIs and associated CIs before decoding the fetched LIs and CIs prior to forward the decoding results of the reordered CIs and LIs to the backend processors in order to provide compatibility of the transformed LIs and CIs.

The invented CAL memory system apparatus prefetches and fetches LIs and/or CIs from the single or plurality of concurrently accessible LI and/or CI main memories via a single or plurality of levels of concurrently accessible LI and CI caches to the frontend processors. More specifically, the CAL memory system apparatus is capable of prefetching the single or plurality of LIs and/or CIs in a lookahead manner from the locations of the LI main memories to the locations of the single or plurality of levels of the LI caches or the locations from the upper-level LI caches to the locations of the lower-level LI caches. The CAL memory system apparatus produces a single or plurality of the LI addresses from the accessed LIs if needed and uses for accessing the LIs from a single or plurality of locations addressed from the LI main memories and/or the LI caches. In addition, the next prospective LIs and the associated CIs from both of takenbranch and fall-through paths are prefetched while repeating the LI and CI prefetch operations for limited times. More specifically, the LI and the CI prefetch operations are resumed if any LI or CI cache miss is occurred, where a cache miss is a state where the data requested to access is not found in the cache memory.

The CAL memory system apparatus provides functional compatibility while enhancing performance of the processors by performing lookahead branch prediction and lookahead prefetch/fetch of the LIs and CIs. More specifically, the multi-cycle taken-branch prediction latencies are overwrapped by the lengthy CI fetch cycles. Thus, the branch prediction latencies are hidden. The LI and CI cache miss latencies are also overwrapped by early launching prefetch and fetch operations and by the short access time of the LI/CI caches. Furthermore, the CAL memory system apparatus fragments a long basic block to a plurality of the short instruction streams to prefetch and fetch LIs and CIs in order to increase parallel accesses and to decrease the overall prefetch and fetch cycles. Alternatively, the BBC directly produces the LIs and the associated CIs from high-level language program in prior arts.

The CAL memory system apparatus adaptively utilizes available instruction caches in terms of the cache access time, size, and energy consumption. In addition, the invention is able to fetch the various types of LIs and the associated CIs in an accurate manner by only fetching the CIs unlike additional instructions are often fetched in case of the misaligning between a number of the instructions found in the basic block and a number of the instructions stored in the cache block or accessed via the instruction fetch bus width.

Through this invention, one can decompose their own compatible and ciphered instructions as various LIs and the associated CIs and prefetch and fetch the LIs and the CIs in sequential and/or parallel from the LI and CI main memories via the levels of the LI and CI caches.

PROBLEMS OF THE ART

Accessible instruction-level parallelism, branch prediction accuracy, and instruction fetch (i-fetch) bandwidth are important parameters that affect the performance of a superscalar processor. Since the i-fetch bandwidth is closely related to branch prediction latency and instruction cache (i-cache) miss latency, various i-fetch, i-prefetch, i-cache, and branch prediction schemes have been developed for improving i-fetch bandwidth of both high-performance out-of-order superscalar processors and energy-efficient in-order superscalar processors.

U.S. Pat. No. 7,181,597 [1] provides enhanced performance by employing a trace cache. In particular, this approach decodes the first instruction into a single or plurality of operations with a decoder. The decoder passes the first copy of the operations to a build engine associated with a trace cache. In addition, the decoder directly passes the second copy of the operation to a backend allocation module in a decoder. This approach enhances performance by selectively bypassing a trace cache build engine.

A trace cache [2] is presented that contains decoding information of the instructions consecutively executed before. To achieve higher throughput from superscalar processors, fetching multiple basic blocks per cycle becomes necessary. The trace cache supplements instruction cache by dynamically tracing the i-stream and contiguously locating the instructions. The trace cache directly passes the decoding information when the same i-stream is decoded. Consequently, performance enhancement and high bandwidth i-fetching can be achieved. However, this approach heavily relies on the capability of employing branch prediction hardware. The trace cache approach must obtain decoding results after dynamically decoding the same instructions. The trace cache approach cannot hold all of the traces of the multiple basic blocks without increasing the trace cache size. This approach also must decode again and keep the trace of the decoded results of the instruction block if the trace of the same block is changed.

U.S. Pat. No. 6,167,536 [3] presents an on-chip instruction trace cache capable of providing information for reconstructing instruction execution flow. More specifically, U.S. Pat. No. 6,167,536 presents the instructions that disrupt the instruction flow by branches, subroutines, and data dependencies. Therefore, this approach allows less expensive external capture hardware to be utilized and also alleviates various bandwidth and clock synchronization issues confronting many existing solutions.

U.S. Pat. No. 6,047,368 [4] claims that an instruction packing apparatus employs a compatibility circuit including translation and grouper circuits where the translation and grouper circuits, respectively, transform old instructions to new instructions as simpler forms and group instructions based on instruction type by hardware when transferring a cache block from the memory to the cache. Although the dynamical packing and identifying of assigned functionalities of the assembled instructions issue and execute concurrently, this approach focuses only on increasing instruction level parallelism while paying additional hardware cost. U.S. Pat. No. 6,047,368 still requires at least the same or more instruction cache.

U.S. Pat. No. 5,509,130 [5] describes packing and issuing instructions simultaneously per clock cycle for execution. An instruction queue stores sequential instructions of a program and branch target instruction(s) of the program, both of which are fetched from the instruction cache. The instruction control unit decodes the sequential instructions, detects operands cascading from instruction to instruction, and groups instructions according to a number of exclusion rules which reflect the resource characteristics and the processor structure. This approach, however, groups instructions after fetching sequential instructions from the instruction cache. Therefore, it still requires involving branch prediction and resolution units for branch instructions because of packing at runtime.

U.S. Pat. No. 7,269,715 [6] presents an improved method and apparatus for packing instructions processed in the same sized instruction sets. This approach distinguishes a current set of instructions received as part of a group including a prior set of instructions using a history data structure. The assembled or reformatted nonnative instructions with a packing indication are issued to the execution units. This approach requires additional hardware, such as grouper circuit and translation circuit.

U.S. Pat. No. 8,527,969 [7] presents systems and methods for dynamic binary translation in an interpreter. U.S. Pat. No. 8,245,208 [8] presents to generate loop code to execute on single-instruction multiple-datapath architecture. U.S. Pat. No. 5,999,739 [9] presents a procedure to eliminate redundant conditional branch statements from a program.

Instruction prefetching is complicated and implemented as hardware [10, 11] unlike data prefetching. Since i-prefetching accuracy is an important factor to mitigate i-cache pollution, often i-prefetchers employ branch predictors to achieve further alleviation of i-fetch bandwidth [12, 13]. Existing lookahead prefetching, however, is still limited by branch prediction bandwidth [14]. Therefore, the invented CAL memory system does not include any branch predictors for prefetching. In order to provide a lookahead i-prefetching capability, the branch targets are obtained by decoding LIs. A fewer number of LIs are prefetched first and then the associated CIs are prefetched in parallel from the concurrently accessible CAL memory system in order to mitigate disadvantages of the wrong path approach [15], such as increasing memory/cache traffic and pollution.

In addition, the invention temporarily holds its next i-fetch operation until the LI is predicted. This prevents unwanted CIs from being fetched to the lookahead frontend processor.

Since each basic block representing a loop or a subroutine comprises one or more than one LI or one LI instruction, the single or plurality of CIs is prefetched in a sequential or concurrent manner. Therefore, prefetching early an ample number of CIs with a single LI concurrently and fetching the prefetched CIs can compensate multi-cycle i-cache or even longer main memory access time.

In addition, a number of instructions in a basic block are fragmented in order to balance the i-cache usage by allocating the instructions of the consecutively located LIs to the dedicated, separate regions in instruction caches and/or main memories, such as cache/memory banks, dual or multiple ports memories, and so forth. Consequently, the i-cache usage in the invention reduces unused or frequently replaced cache lines according to the associated cache replacement policy.

SUMMARY OF THE DISCLOSURE

The invention generally relates to a processor system comprising a software compiler as a basic block compiler (BBC) and a compiler-assisted lookahead (CAL) memory system comprising a single or plurality of lookahead instruction/compatible instruction (LI/CI) main memories and caches, a CAL memory management unit (CAL-MMU), a CAL frontend processor comprising a CI-fetch queue, a CI-program counter, a branch predictor, an LI/CI reorder buffer, an instruction decoder, and other units typically found in backend processor in prior arts.

The BBC identifies various types of the basic blocks in a program, including an assembly program, in prior arts and generates pairs of the LIs and the associated CIs for fetching instructions in a lookahead manner while providing compatibility of the program. The BCC also creates different types of LIs for performing lookahead fetch of LIs and/or CIs, (1) for performing lookahead branch prediction, (2) for performing lookahead loop operations, (3) for controlling flow of LI fetch without fetching the LIs to the frontend processor, (4) for increasing or decreasing parallel fetch of LIs and/or CIs according to various organizations of the CAL caches/memories, and (5) for performing the other operations useful in processor.

The CAL memory system comprises a single or plurality of LI and CI main memories, and a single or plurality of levels of CI caches, such as L1 and/or L2 LI and CI caches.

The CAL-MMU comprising an LI-prefetch unit and an LI-fetch unit prefetches a single or plurality of LIs from the LI main memories to the L2 and/or L1 LI caches in sequence or parallel when all levels of the LI caches are missed. More specifically, the LI-prefetch unit prefetches a single or plurality of LIs from the upper-level (i.e., L2) LI caches to the lower-level (i.e., L1) LI caches in sequence or parallel when the upper-level LI caches are missed.

The CAL-MMU also prefetches a single or plurality of CIs from the CI main memories to the L2 and/or L1 CI caches in sequence or parallel after the associated LIs are prefetched. The CAL-MMU prefetches a single or plurality of CIs from the upper-level (i.e., L2) CI caches to the lower-level (i.e., L1) CI caches in sequence or parallel when the associated LIs are prefetched from the upper-level LI caches. More specifically, the CI prefetch is initialed by the associated LI prefetch after obtaining a single or plurality of the CIs' initial accessing addresses.

The CAL-MMU prefetches LIs without a branch predictor. More specifically, the CAL-MMU includes a single or plurality of the LI decoders to provide branch target addresses of LIs if the target addresses are decoded from the LIs. Therefore, LIs from the branched paths and from the fall-through paths are prefetched for limited times (i.e., two or three consecutive branched and non-branched paths). Otherwise, the CAL-MMU prefetches LIs from only the fall-through paths of limited times.

The CAL-MMU fetches a single or plurality of LIs from the lower-level LI caches to the frontend processor in sequence or parallel. The CAL-MMU initiates the LI prefetch when the lower-level of the LI caches are missed. More specifically, the CAL-MMU decides which LI is fetched to the frontend processor according to the type of the LI fetched. The CAL-MMU fetches a single or plurality of CIs from the lower-level CI caches to the frontend processor in sequence or parallel.

The CAL-MMU prefetches and fetches both of LIs and/or CIs concurrently if needed. The CAL-MMU also prefetches and fetches LIs sequentially and CIs concurrently while both of the LI and CI prefetch and fetch are concurrently. Therefore, the CAL-MMU performs the lookahead prefetch to alleviate the cache accessing latencies due to the cache traffic and pollution.

The CAL memory system is for delivering the LIs required to be predicted for the branch operations before delivering the associated CIs regardless of the instruction order determined in the program before the BBC compilation. The CAL memory system fetches a limited amount of the LIs (i.e., up to three consecutive LIs) to a branch predictor in the pipelined parallel manner. Therefore, the branch predictor receives the LIs in earlier cycles than i-fetch mechanisms in prior arts can do. In addition, the single branch predictor predicts the plurality of LIs in sequence, while fetching the associated CI information blocks in parallel and limiting to fetch unnecessary CI information blocks due to the miss predicted LIs.

There has thus been outlined, rather broadly, some of the features of the invention in order that the detailed description thereof may be better understood, and that the present contribution to the art may be better appreciated. Additional features of the invention will be described hereinafter.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide the CAL memory system apparatus that improves the performance and energy efficiency of the lookahead processor, including the achievement of lookahead branch predicting and lookahead concurrent prefetching and/or fetching of LIs and CIs, for enhanced processor throughput while maintaining compatibility of the software.

An object is to provide the BBC that transforms the instructions in the software and/or assembly program into LIs and CIs. Alternatively, the LIs and CIs can also be generated by a single compilation that includes the same instruction assembling capability as the invented system. The BBC identifies basic blocks and/or i-streams to LIs and/or CIs. The LIs are composed by assigning different opcodes and other information to the LIs if needed.

Another object is to provide the BBC that eliminates and/or hides non-prediction-required branch instructions, including unconditional jumps, while the program is executed by a processor.

Another object is to provide the BBC that composes compatible and customized forms of the LIs and CIs for preventing malicious and illegal copying of various software programs while providing compatibility of the software programs to the lookahead processor.

An object is to provide the CAL memory system that decodes the LIs for concurrently prefetching and fetching the associated CIs stored in dedicated, separate regions of distinct addresses in a single or plurality of the LI memories and/or the LI caches.

Another object is to provide the CAL memory system that obtains an initial accessing address of the CIs from the decoding results of the LIs and prefetches and/or fetches the CIs.

Another object is to provide the CAL memory system that prefetches a single or plurality of LIs from the next prospective locations, such as the next LI at the branch target location and the next LI at the fall-through path, whenever prefetching an LI.

Another object is to provide the CAL memory system apparatus that provides a way to satisfy the LI/CI cache usage and reducing branch prediction and cache access latencies through the invented lookahead, pipelined, and parallel prefetching and fetching, unlike memory systems employed in processors in prior arts.

Another object is to provide the CAL memory system apparatus that utilizes LIs, which encapsulate only undisrupted instruction segments, in the program to prefetch the single or plurality of LIs and/or CIs that will be prefetched, fetched and executed by the lookahead processor, unlike prefetching and fetching a certain number of the instructions that include many of the unused instructions for execution of the processor in prior arts.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called, however, to the fact that the drawings are illustrative only, and that changes may be made in the specific construction illustrated and described within the scope of this application.

BRIEF DESCRIPTION OF THE DRAWINGS

A more complete understanding of embodiments of the disclosure will be apparent from the detailed description taken in conjunction with the accompanying drawings in which:

FIG. 1 is also a diagram showing one embodiment of the CAL memory system apparatus for from the different organizations of the CI caches comprising a plurality of the CI cache blocks for accessing a single or plurality of the CI information blocks;

FIG. 2 is also a diagram showing one embodiment of the CAL memory system apparatus for a parallel access of a single or plurality of the CI cache blocks stored in a plurality of the CI banks in a CI cache.

DETAILED DESCRIPTION OF EXAMPLE EMBODIMENTS

Figure 1:
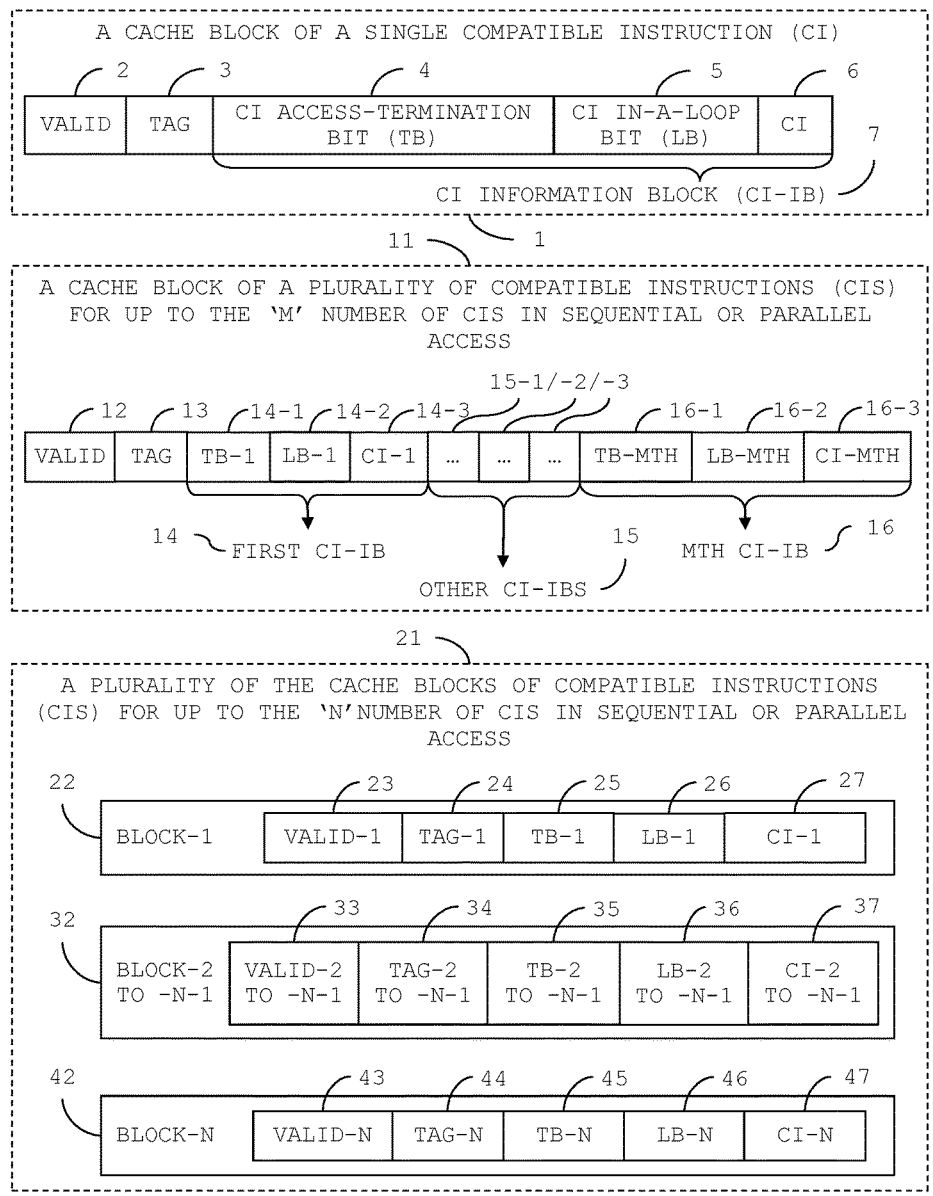
FIG. 1 is a diagram showing one embodiment of the CAL memory system apparatus for accessing a CI information block comprising of a CI, a CI access-termination bit, and a CI in-a-loop bit stored from the organization of a CI cache block comprising a valid bit, tag bits, the CI information block as well as for accessing a single or plurality of the CI information blocks stored from the organization of the CI cache block in sequential or parallel.

FIG. 1 is a diagram showing one embodiment of the CAL memory system apparatus for sequentially accessing a CI information block 7 comprising of a CI access-termination bit 4, a CI in-a-loop bit 5, and a CI 6 stored from the organization of the CI cache block 1 comprising a valid bit 2, the tag bits 3, and a CI information block 7 wherein the CI information block 7 comprises additional fields if needed. More specifically, the CI information block provides the CI access-termination bit 4 for distinguishing the last CI in the same basic block, the CI in-a-loop bit 5 for indicating the CI in a loop, and the CI 6 for producing compatible result of the instruction programmed before the BBC compilation.

FIG. 1 is also a diagram showing one embodiment of the CAL memory system apparatus for sequentially or concurrently accessing a single or plurality of the CI information blocks 14, 15, 16 comprising the CI access-termination bits 14-1, 15-1, 16-1, the CI in-a-loop bits 14-2, 15-2, 16-2, and CIs 14-3, 15-3, 16-3 stored from the organization of the CI cache block 11 comprising a valid bit 12, the tag bits 13, a single or plurality of the CI information blocks 14, 15, 16 wherein the CI access-termination bit (TB-1) 14-1, the CI in-a-loop bit (LB-1) 14-2, and the CI (CI-1) 14-3 are the first CI information block 14 and are accessed together from and to the CI cache block 11. The 'M'th CI information block 16 comprises of the CI access-termination bit (TB-MTH) 16-1, the CI in-a-loop bit (LB-MTH) 16-2, and the CI (CI-MTH) 16-3, wherein the CI 16-3 is one of the CI in a basic block or loop, the CI access-termination bit 16-1 indicates whether or not the CI 16-3 is the last CI in the basic block or the loop, and the CI in-a-loop bit 16-2 indicates whether or not the CI 16-3 is in the loop. The CI information block prefetch and/or fetch must be terminated after prefetching and/or fetching the current CI information block 16 if the CI access-termination bit 16-1 indicates the CI 16-3 is the last CI of the CIs in the same basic block or loop. More specifically, the CI fetch from the CI memory system comprising the CI memory 83, the CI cache (i.e., L2/L1 CI caches) 117, must be terminated, but from the CI fetch queue 124 must be reinitiated to fetch the first CI information block 14 from the same loop if both of the CI access-termination bit 16-1 and the CI in-a-loop bit 16-2 indicate the CI 16-3 is the last CI in the loop and the next loop is predicted to be iterated.

FIG. 1 is also a diagram showing one embodiment of the CAL memory system apparatus for accessing a plurality of the CI cache blocks 22, 32, 42 accessible from the CI cache in a parallel manner. More specifically, the CI cache block comprising a valid bit (VALID-1) 23, tag bits (TAG-1) 24, and a CI information block comprising a CI access-termination bit (TB-1) 25, and a CI in-a-loop bit (LB-1) 26, and a CI 27 is concurrently accessible with another or plurality of other CI cache blocks 32, 42. In addition, a single or plurality of the CI cache blocks in the same CI cache 21 is accessible in parallel depending on the size of the CI bus connected to the CI cache 21.

Figure 2:
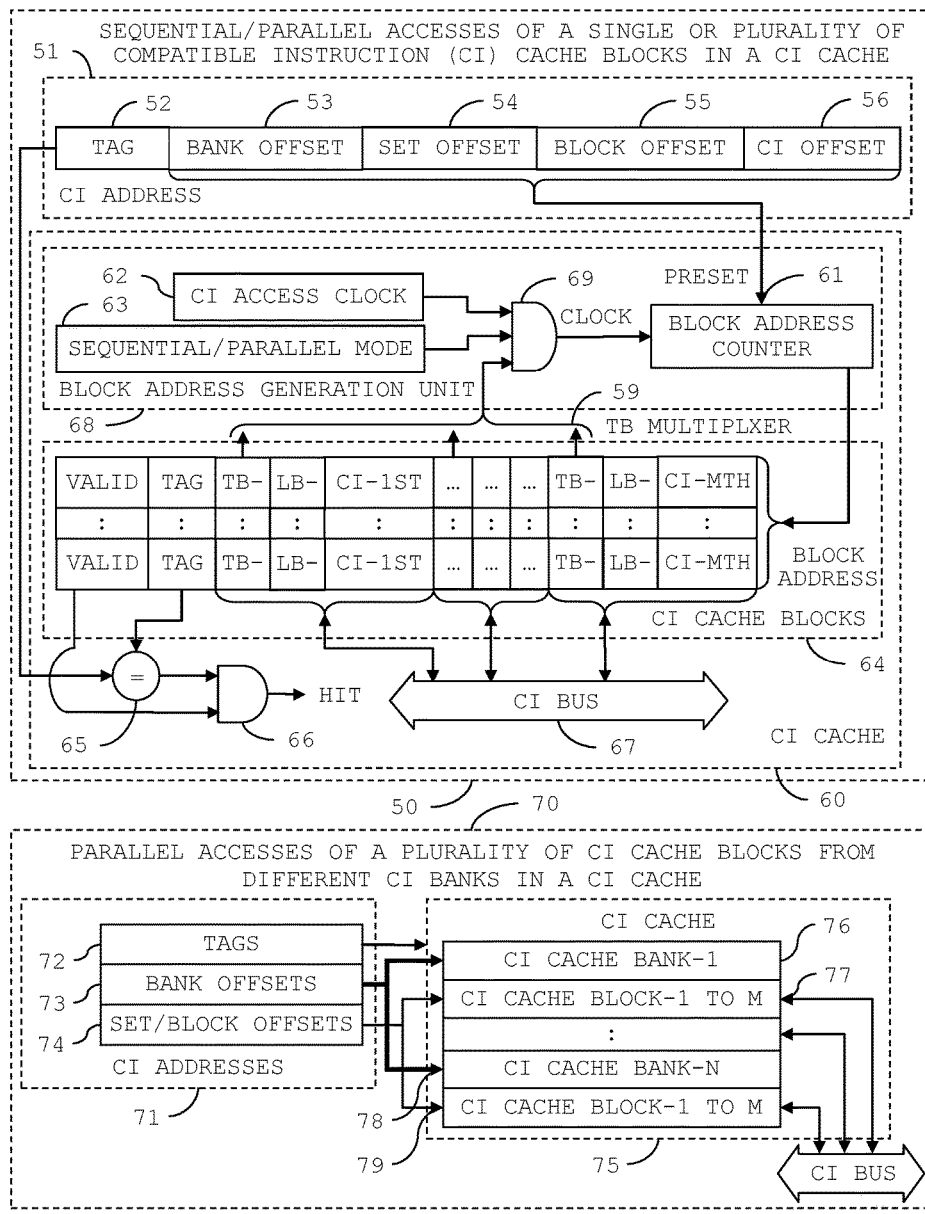
FIG. 2 is a diagram showing one embodiment of the CAL memory system apparatus for a sequential and/or parallel access of a single or plurality of the CI information blocks stored in a plurality of the CI blocks in a CI cache by receiving a CI address comprising tag bits and other offset fields and by processing the CI address to generate a CI block address from a block address generation unit, by accessing a CI block with the CI block address in the CI cache blocks, by processing the tag bits received from the CI address and from the CI cache block accessed and generating a hit signal for reading the CI information blocks from the CI cache block to a CI bus, and by writing the CI information blocks and other fields, including the valid bit and the tag bits from the CI bus to the CI cache block addressed by the CI block address.

FIG. 2 shows one embodiment of the CAL memory system apparatus for sequential and parallel accessing of a single or plurality of the CI cache blocks 64 stored in a CI cache 60 upon receiving a CI address 51 comprising of tag bits 52, bank offset bits 53, set offset bits 54, block offset bits 55, and CI offset bits 56 wherein the tag bits 52 are for differentiating the CIs from different regions of the CI main memory mapped into the CI cache block; the bank offset bits 53 are for determining one of the CI cache banks; the set offset bits 54 are for determining one of the CI cache sets residing in the selected CI cache bank; the block offset bits 55 are for determining one of the CI cache blocks residing in the accessed CI cache set; and the CI offset bits 56 are for determining one of the CI information blocks residing in the accessed CI cache block. More specifically, the set offset bits 54 are eliminated or merged to the bank offset bits 53 or the block offset bits 55 if the CI cache 60 does not employ any set. Similarly, the bank offset bits 53 are also eliminated or merged to the set offset bits 54 or the block offset bits 55 if the CI cache 60 does not employ any bank.

In one embodiment, the CI cache 60 comprises a plurality of the CI cache blocks 64. Each of the CI cache blocks 64 comprises a valid bit for indicating whether a single or plurality of the CI information blocks stored in the CI cache block is valid or not, the tag bits for differentiating the CI information blocks from different regions of the CI main memory mapped into the CI cache block, and a plurality of the CI information blocks comprising a plurality of bundles of the CI access-termination bit (TB-1, or TB-MTH), the CI in-a-loop bit (LB-1, or LB-MTH), and the CI (CI-1ST, or CI-MTH). More specifically, a CI information block is accessed together from the valid CI cache block tagged via the CI bus 67 while generating a hit signal from the CI cache hit signal generation circuit 66 after evaluating the valid bit accessed from the CI cache block addressed by a block address generation unit 68 after receiving the comparison result of the tag bits 52 from the CI address 51 with the tag bits from the CI cache block accessed via a tag comparison circuit 65.

In one embodiment, the block address generation unit 68 comprises of a clock generation circuit 69 for receiving inputs, including a CI access clock 62, a sequential or parallel mode switch 63, and a CI access-termination bit multiplexer 59 for selecting one of the CI access-termination bits accessed from the CI cache block and for generating and delivering a clock signal to a block address counter 61 via a clock input to update (i.e., increase or decrease) next counter value as a new CI block address; and the block address counter 61 for receiving a preset input from one or plurality of bundles of the offset bits, including the bank offset bits 53, the set offset bits 54, the block offset bits 55, and/or the CI offset bits 56, for loading an initial block address. More specifically, the block address generation unit 68 continuously generates next CI block address by accessing the next CI access-termination bit from the same CI cache block until the accessed CI access-termination bit indicates to terminate the CI cache block access. A CI information block is accessed from or to the CI bus 67 if the CI cache hit signal is generated with the sequential mode. Otherwise, the CI cache block read must be invalid. More specifically, a plurality of the CI information blocks from the beginning of a basic block to the ending of the same basic block are accessed from or to the CI bus 67 if the CI cache hit signal is generated with the parallel mode.

In one embodiment, a single or plurality of the CI information blocks is read from or written to one of the CI cache blocks 64 addressed by the block address received from the block address counter 61. The CI offset bits 56 are excluded to preset the block address counter 61 if all of the CI information blocks are accessed from or to the CI cache block concurrently. The CI offset bits 56 are included to preset the block address counter 61 if a single or plurality of the CI information blocks is accessed from or to the CI cache block at each CI access clock 62. The block address counter 61, then, generates the block address to access a single or plurality of the CI information blocks at each of the CI access clock 62.

In one embodiment, the CI cache blocks 64 can be replaced with a plurality of the CI cache blocks 1 illustrated in FIG. 1 for sequentially accessing the CI information blocks from a plurality of the different CI cache blocks 1. The block address counter 61 receives the offset bits of an initial CI address 51, including the bank offset bits 53, the set offset bits 54, and the block offset bits 55, via the preset input and generates the CI cache block address of the first CI information block. The block address counter 61 continues to receive a clock signal via the clock generation circuit 69 with the inputs of the CI access clock 62, the sequential or parallel mode switch 63, and the CI access-termination bit of the CI block accessed and generates the CI cache block address of the next CI information block until the current CI access-termination bit indicates to terminate the next CI information block access.

In one embodiment, a plurality of the CI addresses 71 comprising a plurality of the tag bit 72, a plurality of the bank offset bits 73, and a plurality of the set/block offset bits 74 is delivered to a CI cache 75 for accessing a single or plurality of CI cache blocks 77 in a CI cache bank-1 76 and for accessing a single or plurality of CI cache blocks 79 in a CI cache bank-N 78. More specifically, a plurality of the CI information blocks from the different CI cache banks is stored to a plurality of the entries of the CI-fetch queue 124. Therefore, more CI information blocks can be prefetched and/or fetched within the same or less clock cycles.

Figure 3:
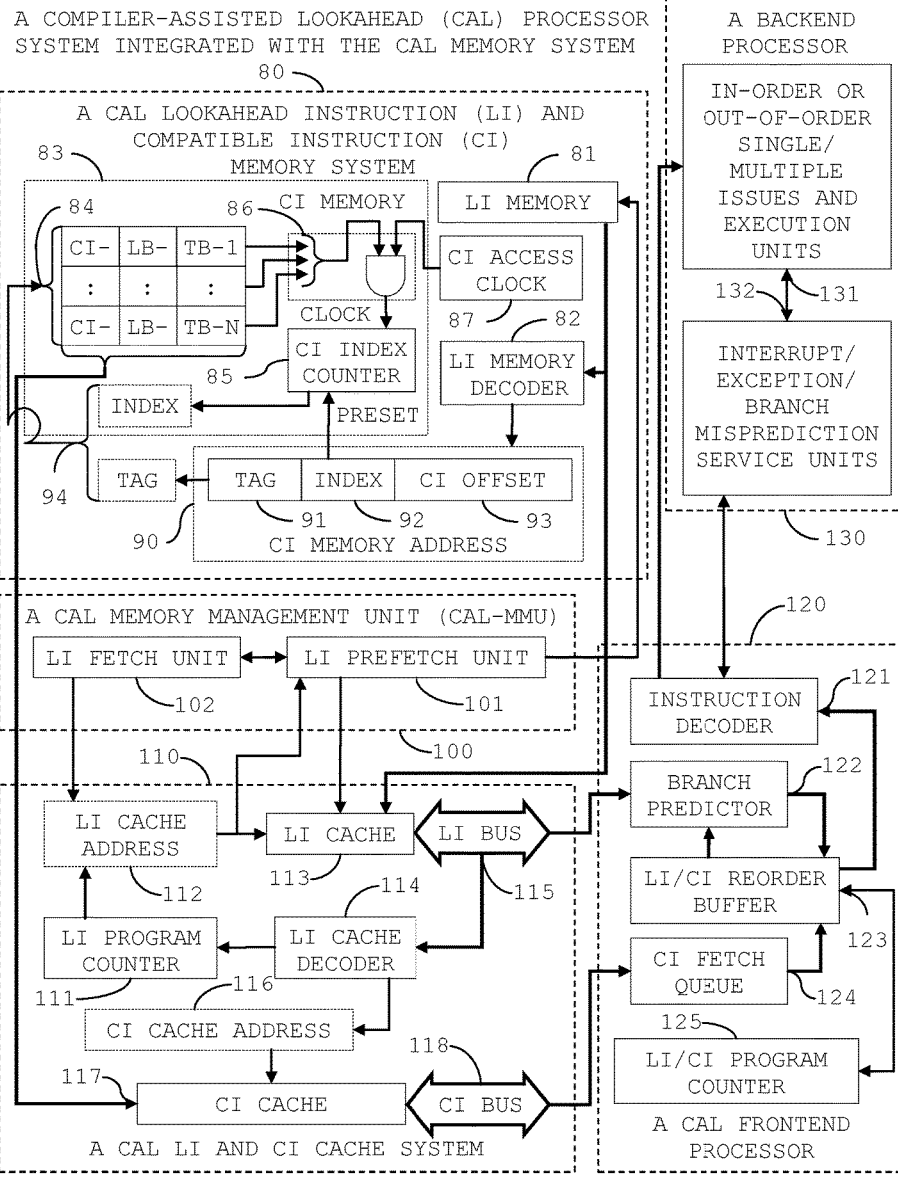
FIG. 3 is a diagram showing one embodiment of the CAL processor system comprising a CAL memory system, a CAL frontend processor, and a backend processor found in prior arts for delivering a single or plurality of the LIs in a lookahead manner and for delivering a single or plurality of the CI information blocks from the CAL memory system to the CAL frontend processor, which predicts branches with the LIs fetched before or while fetching the associated CI information blocks and reorders the fetched LIs and the CIs before decoding with the decoder found in prior arts for maintaining compatibility of the program in prior arts and for enhancing performance and operational energy efficiency with the backend processor.

FIG. 3 shows one embodiment of a CAL memory system apparatus for a CAL processor system comprising a CAL memory system, a CAL frontend processor 120, and a backend processor 130 in prior arts for delivering instructions of the program compiled by the BBC compiler to enhance performance of the backend processor 130 while improving efficiency of the operational energy consumption and compatibility of the program.

The CAL processor system fetches a single or plurality of LIs from the CAL memory system for lookahead branch prediction before fetching CI information blocks from the CAL memory system to the CAL frontend processor 120 in a sequential or parallel manner. The CAL frontend processor 120 reorders the LIs fetched and the CI information blocks and extracts the CIs from the CI information blocks for producing compatible results by the backend processor 130.

In one embodiment, the CAL memory system comprising a CAL LI and CI memory system 80, a CAL LI and CI cache system 110, and a CAL memory management unit (CAL-MMU) 100 for prefetching a single or plurality of LIs from a LI memory 81 to a LI cache 113 and a single or plurality of the CI information blocks from a CI memory 83 to a CI cache 117 with the CAL-MMU 100 in a lookahead manner and for fetching a single or plurality of the LIs from the LI cache 113 to a branch predictor 122 and a single or plurality of the CI information blocks from the CI cache 117 to a CI fetch queue 124 with the CAL-MMU 100.

In one embodiment, the CAL-MMU 100 comprising a LI prefetch unit 101 and a LI fetch unit 103 for generating or receiving a single or plurality of addresses to prefetch a single or plurality of LIs from the LI memory 81 to a LI cache 113 and for generating or receiving a single or plurality of the LI cache addresses 112 to fetch a single or plurality of LIs from a LI cache 113 to the branch predictor 122 in the CAL frontend processor 120 via a LI bus 115.

In one embodiment, the CI memory 83 comprising a plurality of the CI information block memory storages 84, a CI index counter 85, and a CI index counter clock generation unit 86 connected to a CI access clock 87 and to a selected signal of the CI access-termination bit (TB-1 or TB-N) stored in one of the CI information block memory storages 84 for accessing a single or plurality of the CI information blocks upon receiving a CI memory address 90 comprising tag bits 91, index bits 92, and CI offset bits for presetting the CI index counter 85 to generate an address 94 of a CI information block memory storage comprising an index from the CI index counter 85 and the tag bits extracted from the CI memory address 90. The CI memory 83 reads a single or plurality of the CI information blocks stored from the CI information block memory storages 84 and writes the single or plurality of the CI information blocks to the CI cache 117 during the CI prefetch. The CI memory address 90 is generated by a LI memory decoder 82 receiving a single or plurality of LIs from the LI memory 81 during the LI prefetch.

The LI prefetch unit 101 updates next LI memory address to prefetch a single or plurality of next LIs. The LI prefetch is initiated whenever any LI cache miss occurs or after a certain number (i.e., three) of LIs are prefetched from both of the next LI paths, including a fall-through path and a branched path, wherein the LI cache miss occurs when any LI addressed is not found from the LI cache, the fall-through path is a location of next LI if the current LI does not take a branch, and the branched path is a location of next LI if the current LI takes a branch. More specifically, certain LIs transformed from subroutine calls/returns, unconditional jumps, and other flow control instructions providing next LI addresses without any additional information are only accessed from the target LI addresses without counting up LI prefetches.

In one embodiment, the CAL LI and CI cache system 110 comprising a single or plurality of levels of LI caches 113 and a single or plurality of levels of CI caches 117, respectively, for fetching a single or plurality of LIs to the branch predictor 122 via the LI bus 115 upon receiving a single or plurality of the LI cache addresses 112 from the LI fetch unit 102 or from an LI program counter 111 and for fetching a single or plurality of the CI information blocks to the CI fetch queue 124 via the CI bus 118 upon receiving a single of plurality of the CI cache addresses 116 from a LI cache decoder 114 receiving a single or plurality of LIs from the LI cache 113 via the LI bus 115.

In one embodiment, the CI cache 117 comprising the components showed as the CI cache 60 and 70 for operating as the sequential/parallel accesses of the CI caches with/ without the CI banks shown in FIG. 2. A single or plurality of the CI information blocks is accessed (i.e., read from and/or written to) upon receiving a single or plurality of the CI cache addresses 116 shown as the CI addresses 51, 71 in FIG. 2 during the CI fetch.

The LI fetch unit 102 updates next LI cache address to fetch a single or plurality of next LIs. The LI fetch is initiated whenever any LI access is requested by the LI fetch unit 102, by the branch predictor 122, by the interrupt/ exception/branch misprediction service units 132, or by the LIs transformed from subroutine calls/returns, unconditional jumps, and other flow control instructions providing next LI addresses without any additional information.

In one embodiment, the CAL frontend processor 120 comprising the branch predictor 122, the CI fetch queue 124, the LI/CI program counter 125, the LI/CI reorder buffer 123, an instruction decoder 121, and other components if needed for sequentially or concurrently fetching a single or plurality of LIs to the branch predictor 122 in a lookahead manner before sequentially or concurrently fetching a single or plurality of the CI information blocks to the CI fetch queue 124. More specifically, the CAL frontend processor 120 predicts branches with the LIs fetched to the branch predictor 122, reorders the LIs and the CIs extracted from the CI information blocks for producing compatible results of decoding and execution, and decode the LIs and CIs if the LIs and CIs stored in the LI/CI reorder buffer 123 are not reused for the loop operation. Otherwise, the CAL frontend processor 120 further fetches a single or plurality of LIs and the associated CI information blocks in a single or plurality of loops from the branch predictor and a reorder buffer or from a CI fetch queue, instead of fetching from the CAL memory system for enhancing loop operation performance and saving energy for fetching from the CAL memory system.

The branch predictor 122 predicts whether a single or plurality of the LIs takes branches or not, generates a single or plurality of the branch target locations of the LI fetched in the order of the LI fetched if the LIs are predicted to take branches, updates the branch target addressed predicted to the LI fetch unit 102 and the LI prefetch unit 101, and transmits the LIs predicted to the LI/CI reorder buffer 123 for reordering the LIs and the CI information blocks before decoding the LIs and CIs.

The CI fetch queue 124 receives a single of plurality of the CI information blocks from the CI cache 117 via the CI bus 118, determines of which the CI information blocks fetched are stored, forwards the CI information blocks to the LI/CI reorder buffer 123 for reordering the LIs and the CI information blocks, extracts the CIs from the CI information blocks stored in the LI/CI reorder buffer 123, and forwards the LIs and CIs to the instruction decoder for producing compatible decoding results of the LIs and CIs.

The LI/CI reorder buffer 123 receives the LIs from the branch predictor 122 and the CI information blocks from the CI fetch queue 124 and reorders the CI information blocks and the LIs according to the sequences of the CI information blocks and the LI compiled by the BBC compiler. More specifically, only an LI is stored if not having any of the associated CI information block. The LI/CI reorder buffer 123 also operates as a first-in first-out (FIFO) buffer and updates the values of pointers to read from and to write to the LI/CI reorder buffer 123 to the LI/CI program counter 125 according to the number of the CIs and/or the LI in the same basic block is forwarded to the instruction decoder 121. The LI/CI reorder buffer 123 uses the LI/CI program counter values for servicing disrupted operations initialed by the interrupt/exception/branch misprediction service units 132 or by any other component in the CAL processor system initiating a disrupted operation. More specifically, the LI/CI reorder buffer 123 disables the CAL memory system in order to reduce energy consumption due to the prefetch and fetch operations in the CAL memory system while continuously fetching the CI information blocks from the LI/CI reorder buffer 123 and the LIs via the branch predictor 122 for a single or plurality of loop operations. The LI/CI reorder buffer 123 fetches the CI information blocks from the CI fetch queue 124 if all of the CI information blocks in the loops are not stored in the LI/CI reorder buffer 123 but stored in the CI fetch queue 124.

The LI/CI program counter 125 stores a single or plurality of values of pointers to access the LI/CI reorder buffer 123 for resuming the normal operations of the CAL frontend processor 120 after completion of the disrupted operations and for operating a single or plurality of loops without accessing the CAL memory system.

The instruction decoder 121 receives a single or plurality of the CIs and the LIs reordered from the LI/CI reorder buffer 123, decodes the CIs and the LIs, produces the decode results of the CIs and LIs, and forwards the decode results to the backend processor 130. The instruction decoder 121 can be the instruction decoder for the backend processor in prior arts.

In one embodiment, the backend processor 130 comprising the interrupt/exception/branch misprediction service units 132, the in-order or out-of-order single/multiple issues and execution units 131, and other components found in backend processor in prior arts for receiving the decode results of instructions and for executing the instructions to produce the compatible results of the program compiled without the BCC compiler. More specifically, the interrupt/exception/branch misprediction service units 132 detects disrupted operation requests, switches the normal operations of the CAL frontend processor 120 and of the backend processor 130 to the disrupted operations, and resumes the normal operations after completion of the disrupted operations.

COMPILER-ASSISTED LOOKAHEAD (CAL) MEMORY SYSTEM APPARATUS FOR MICROPROCESSORS

Index of Elements
- 1: A CACHE BLOCK OF A SINGLE COMPATIBLE INSTRUCTION (CI)
- 2: A VALID BIT
- 3: TAG BITS
- 7: CI INFORMATION BLOCK (CI-IB)
- 4: CI ACCESS-TERMINATION BIT (TB)
- 5: CI IN-A-LOOP BIT (LB)
- 6: COMPATIBLE INSTRUCTION (CI)
- 11: A CACHE BLOCK OF A PLURALITY OF COMPATIBLE INSTRUCTIONS (CIS) FOR UP TO THE 'M' NUMBER OF CIS IN SEQUENTIAL OR PARALLEL ACCESS
- 12: A VALID BIT
- 13: TAG BITS
- 14: FIRST CI-IB
- 14-1: FIRST CI ACCESS-TERMINATION BIT (TB-1)
- 14-2: FIRST CI IN-A-LOOP BIT (LB-1)
- 14-3: FIRST COMPATIBLE INSTRUCTION (CI-1)
- 15: OTHER CI-IBS
- 15-1: OTHER CI ACCESS-TERMINATION BIT (TBS)
- 15-2: OTHER CI IN-A-LOOP BIT (LBS)
- 15-3: OTHER COMPATIBLE INSTRUCTION (CIS)
- 16: MTH CI-IB
- 16-1: MTH CI ACCESS-TERMINATION BIT (TB-MTH)
- 16-2: MTH CI IN-A-LOOP BIT (LB-MTH)
- 16-3: MTH COMPATIBLE INSTRUCTION (CI-MTH)
- 21: A PLURALITY OF THE CACHE BLOCKS OF COMPATIBLE INSTRUCTIONS (CIS) FOR UP TO THE 'N'NUMBER OF CIS IN SEQUENTIAL OR PARALLEL ACCESS
- 22: BLOCK-1
- 23: FIRST VALID BIT (VALID-1)
- 24: FIRST TAG BITS (TAG-1)
- 25: FIRST CI ACCESS-TERMINATION BIT (TB-1)
- 26: FIRST CI IN-A-LOOP BIT (LB-1)
- 27: FIRST COMPATIBLE INSTRUCTION (CI-1)
- 32: BLOCK-2 TO BLOCK-N-1
- 33: SECOND VALID BIT TO N-1TH VALID BIT (VALID-2 TO -N-1)
- 34: SECOND TAG BITS TO N-1TH TAG BITS (TAG-2 TO -N-1)
- 35: SECOND CI ACCESS-TERMINATION BIT (TB-2 TO -N-1)
- 36: SECOND CI IN-A-LOOP BIT (LB-2 TO -N-1)
- 37: SECOND COMPATIBLE INSTRUCTION (CI-2 TO -N-1)
- 42: BLOCK-N
- 43: NTH VALID BIT (VALID-N)
- 44: NTH TAG BITS (TAG-N)
- 45: NTH CI ACCESS-TERMINATION BIT (TB-N)
- 46: NTH CI IN-A-LOOP BIT (LB-N)
- 47: NTH COMPATIBLE INSTRUCTION (CI-N)
- 50: SEQUENTIAL/PARALLEL ACCESSES OF A SINGLE OR PLURALITY OF COMPATIBLE INSTRUCTION (CI) CACHE BLOCKS IN A CI CACHE
- 51: CI ADDRESS
- 52: TAG BITS
- 53: BANK OFFSET BITS
- 54: SET OFFSET BITS
- 55: BLOCK OFFSET BITS
- 56: CI OFFSET BITS
- 60: CI CACHE
- 68: BLOCK ADDRESS GENERATION UNIT
- 61: BLOCK ADDRESS COUNTER
- 62: CI ACCESS CLOCK
- 63: SEQUENCTIAL/PARALLEL MODE SWITCH
- 59: CI ACCESS-TERMINATION BIT (TB) MULTIPLEXER
- 69: CLOCK GENERATION CIRCUIT
- 64: CI CACHE BLOCKS
- 65: TAG COMPARISON CIRCUIT
- 66: CI CACHE HIT SIGNAL GENERATION CIRCUIT
- 67: CI BUS
- 70: PARALLEL ACCESSES OF A PLURALITY OF CI CACHE BLOCKS FROM DIFFERENT CI BANKS IN A CI CACHE
- 71: CI ADDRESSES
- 72: A PLURALITY OF TAG BITS
- 73: A PLURALITY OF BANK OFFSET BITS
- 74: A PLURALITY OF SET/BLOCK OFFSET BITS
- 75: CI CACHE
- 76: CI CACHE BANK-1
- 77: CI CACHE BLOCK-1 TO M
- 78: CI CACHE BANK-N
- 79: CI CACHE BLOCK-1 TO M A COMPILER-ASSISTED LOOKAHEAD (CAL) PROCESSOR SYSTEM INTEGRATED WITH THE CAL MEMORY SYSTEM A Cal Memory System
- 80: A CAL LOOKAHEAD INSTRUCTION (LI) AND COMPATIBLE INSTRUCTION (CI) MEMORY SYSTEM
- 81: A SINGLE OR PLURALITY OF LI MEMORIES
- 82: LI MEMORY DECODER
- 83: A SINGLE OR PLURALITY OF CI MEMORIES
- 84: CI INFORMATION BLOCK MEMORY STORAGES
- 85: CI INDEX COUNTER
- 86: CI INDEX COUNTER CLOCK GENERATION UNIT
- 87: CI ACCESS CLOCK
- 90: CI MEMORY ADDRESS
- 91: TAG BITS
- 92: INDEX BITS
- 93: CI OFFSET BITS
- 94: AN ADDRESS OF A CI INFORMATION BLOCK MEMORY STORAGE
- 100: A CAL MEMORY MANAGEMENT UNIT (CAL-MMU)
- 101: LI PREFETCH UNIT
- 102: LI FETCH UNIT
- 110: A CAL LI AND CI CACHE SYSTEM
- 111: LI PROGRAM COUNTER
- 112: A SINGLE OR PLURALITY OF LI CACHE ADDRESSES 113: A SINGLE OR PLURALITY OF LEVELS OF LI CACHES
114: LI CACHE DECODER
115: LI BUS
116: A SINGLE OR PLURALITY OF CI CACHE ADDRESSES
117: A SINGLE OR PLURALITY OF LEVELS OF CI CACHES
118: CI BUS
120: A CAL FRONTEND PROCESSOR
121: INSTRUCTION DECODER
122: BRANCH PREDICTOR
123: LI/CI REORDER BUFFER
124: CI FETCH QUEUE
125: LI/CI PROGRAM COUNTER
130: A BACKEND PROCESSOR
131: IN-ORDER OR OUT-OF-ORDER SINGLE/MULTIPLE ISSUES AND EXECUTION UNITS
132: INTERRUPT/EXCEPTION/BRANCH MISPREDICTION SERVICE UNITS

REFERENCES

1. J. Miller and S. Jourdan, Decoding instructions for trace cache resume state in system passing decoded operations to both trace cache and execution allocation module, U.S. Pat. No. 7,181,597, Feb. 20, 2007.
2. E. Rotenberg, S. Bennett, and J. Smith, "Trace Cache: a Low Latency Approach to High Bandwidth Instruction Fetching," IEEE 29th Annual International Symposium on Microarchitecture, Dec. 2-4, 1996.
3. D. Mann, Trace cache for a microprocessor-based device, U.S. Pat. No. 6,167,536, Dec. 26, 2000.
4. S. Arya, Processor Architecture Including Grouping Circuit, U.S. Pat. No. 6,047,368, Apr. 4, 2000.
5. R. Trauben, M. Hill, and S. Nanda, Method and Apparatus for Grouping Multiple Instructions, Issuing Group Instructions Simultaneously, and Executing Grouped Instructions in a Pipelined Processor, U.S. Pat. No. 5,509,130, Apr. 16, 1996.
6. H. Le, D. Levitan, and J. Ward, Instruction grouping history on fetch-side dispatch group formation, U.S. Pat. No. 7,269,715, Sep. 11, 2007.
7. R. J. Meyers, A. W. Beale, and L. C. Wilton, Systems, methods, and computer programs for dynamic binary translation in an interpreter, U.S. Pat. No. 8,527,969, Sep. 3, 2013.
8. A. E. Eichenberger, K. A. Wang, and P. Wu, SIMD code generation for loops with mixed data lengths, U.S. Pat. No. 8,245,208, Aug. 14, 2012.
9. V. Soni and A. Ayers, Method and apparatus for elimination of redundant branch instructions from a program, U.S. Pat. No. 5,999,739, Dec. 7, 1999.
10. A. Ramirez, O. J Santana, J. L Larriba-Pey, and M. Valero, "Fetching instruction streams," in Proceedings of the 35th Annual IEEE/ACM International Symposium on Microarchitecture (MICRO), pp. 371-382, December 2002.
11. O. J. Santana, A. Ramirez, and M. Valero, "Enlarging instruction streams," IEEE Transactions Computers, 56(10): 1342-1357, 2007.
12. G. Reinman, B. Calder, and T. Austin, "Fetch-directed instruction prefetching," in Proceedings of the 32nd Annual IEEE/ACM International Symposium on Microarchitecture (MICRO), pp. 16-27, December 1999.
13. V. Srinivasan, E. S. Davidson, G. S. Tyson, M. J. Charney, and Thomas R. Puzak, "Branch history guided instruction prefetching," in Proceedings of the 7th IEEE International Symposium on High-Performance Computer Architecture (HPCA), pp. 291-300, February 2001.
14. M. Ferdman, T. F. Wenisch, A. Ailamaki, B. Falsafi, A. Moshovos, "Temporal instruction fetch streaming," in Proceedings of the 41st Annual IEEE/ACM International Symposium on Microarchitecture (MICRO), pp. 1-10, December 2008.
15. J. Pierce and T. N. Mudge, "Wrong-path instruction prefetching," in Proceedings of the 29th Annual IEEE/ACM International Symposium on Microarchitecture (MICRO), pp. 165-175, December 1996.

What is claimed is:

1. An apparatus, for producing a compiler-assisted lookahead (CAL) memory system, a CAL processor system, a CAL memory management unit (MMU), and a CAL lookahead instructions (LI) and compatible instructions (CI) cache system, comprising:
   a CAL memory system;
   a CAL frontend processor; and
   a backend processor;
   wherein the apparatus for producing the CAL memory system for the CAL processor system is operable to:
     store lookahead instructions (LIs) and associated compatible instruction (CI) information blocks comprising CIs and related information fields comprising a CI access-termination field, a CI in-a-loop field, and any additional fields useful for the CAL processor system to the CAL memory system;
   wherein the LIs and the CI information blocks are transformed from the instructions of a program by a basic block compiler (BBC);
   wherein an LI is operable to:
     control flow of basic blocks in a program;
     determine the prefetch and/or fetch order of the basic blocks of the program;
     access the next LI for the LI prefetch and/or fetch;
     access the associated CI information block stored in the CAL memory system by providing a CI address; and
     access next LI without initiating any CI information block access;
   wherein the basic block is a straight-line code sequence:
     with only one branch in to an entry and only one branch out at an exit;
     without any branch to the entry and only branch out at the exit; and without any branch to the entry and out at the exit;
   wherein the CI information block comprising a CI access-termination bit, a CI in-a-loop bit, and a CI;
   wherein the CI information block is operable to: distinguish the last CI in the same basic block with the CI access-termination bit for terminating the CI prefetch and the CI fetch operations;
   identify the CI in a loop with the CI in-a-loop bit for reusing the CI information block already fetched during loop operation and for avoiding to fetch the same CI information block again from the CAL memory system; and
   produce compatible result of the instruction programmed before the BBC compilation with the CI;
   wherein the CIs are all other instructions in a basic block, excluding an instruction transformed to an LI of the basic block;
   fetch a single or plurality of LIs from the CAL memory system for lookahead branch prediction before fetching the associated CI information blocks from the CAL memory system to the CAL frontend processor in a sequential or parallel manner;

predict branches of the LIs fetched to a branch predictor;

reorder the LIs and the CI information blocks for the producing compatible results of decoding and execution;

extract the CIs from the CI information blocks stored in a reorder buffer before decoding the CIs and the LIs; and fetch a single or plurality of LIs and the associated CI information blocks in a single or plurality of loops from the branch predictor and a reorder buffer or from a CI fetch queue, instead of fetching the LIs and the CI information blocks in the loop from the CAL memory system for enhancing performance and saving energy of the loop operation without fetching any of the LIs and the CI information blocks in the loop from the CAL memory system iteratively.

2. The apparatus of claim 1, wherein the CAL memory system further comprises:
a CAL memory management unit (CAL-MMU),
a CAL LI and CI memory system, and
a CAL LI and CI cache system;
wherein the apparatus for producing the CAL memory system is operable to:
perform the LI prefetch and the CI information block prefetch in a lookahead manner with the CAL-MMU;
prefetch a single or plurality of LIs from a LI memory to a single or plurality of levels of LI caches or from the higher level of the LI caches to the lowest level of the LI caches;
prefetch a single or plurality of the CI information blocks from a CI memory to a single or plurality of levels of the CI caches or from the higher level of the CI caches to the lowest level of the CI caches;
perform the LI fetch and the CI information block fetch in a lookahead manner with the CAL-MMU;
fetch a single or plurality of the LIs from the lowest level of the LI caches to a branch predictor in the CAL frontend processor before starting to fetch the associated CI information blocks; and
fetch a single or plurality of the CI information blocks from the lowest level of the CI caches to the CI fetch queue in the CAL frontend processor after fetching the associated LIs.

3. The apparatus of claim 2, wherein the CAL-MMU further comprises:
a LI prefetch unit and
a LI fetch unit;
wherein the apparatus, for producing the CAL-MMU is operable to:
generate or receive a single or plurality of addresses to prefetch a single or plurality of LIs from the LI memory to a single or plurality of levels of the LI caches or from the higher level of the LI caches to the lowest level of the LI caches; and
generate or receive a single or plurality of the LI cache addresses to fetch a single or plurality of LIs from the LI memory, from the higher level of the LI caches, or from the lowest level LI caches to the branch predictor in the CAL frontend processor via a LI bus.

4. The apparatus of claim 3, wherein the LI prefetch unit is operable to:
update next LI memory address to prefetch a single or plurality of next LIs;

initiate the LI prefetch whenever an LI cache miss occurs;
prefetch a single or plurality of LIs from both of the next LI paths, including a fall-through path and a branched path;
wherein the LI cache miss occurs when any LI address is not found from the LI cache; and
wherein the fall-through path is a location of the next LI if the current LI does not take a branch and the branched path is a location of next LI if the current LI takes a branch;
iterate only two or more times of the LI prefetches for balancing between the LI cache pollution and the LI cache miss; and
continue to prefetch the LIs transformed from unconditional subroutine calls and returns, unconditional jumps, and other flow control instructions providing the next branched LI addresses and the LIs from branched addresses.

5. The apparatus of claim 3, wherein the LI fetch unit is operable to:
generate or receive a single or plurality of LI cache addresses to fetch a single or plurality of LIs from a single or plurality of the LI caches to the branch predictor in the CAL frontend processor via the LI bus;
fetch a single or plurality of LIs from a single or plurality of the LI caches to the branch predictor via the LI bus upon receiving a single or plurality of the LI cache addresses from an LI program counter or from the LI fetch unit;
forward a single or plurality of LIs from a single or plurality of the LI caches via the LI bus to a LI cache decoder for generating a single or plurality of CI cache addresses to fetch a single or plurality of the CI information blocks from a single or plurality of the CI caches to a CI fetch queue via a CI bus;
update next LI cache address to fetch a single or plurality of next LIs; and
initiate an LI fetch operation whenever any LI access is requested by the LI fetch unit, by the branch predictor, by interrupt/exception/branch misprediction service units, or by the LIs transformed from unconditional subroutine calls/returns, unconditional jumps, and other flow control instructions providing next LI addresses without any additional information.

6. The apparatus of claim 2, wherein the CAL LI and CI memory system further comprises:
an LI memory and
a CI memory;
wherein the LI memory is operable to access a single or plurality of LIs upon receiving a single or plurality of LI addresses during the LI prefetch;
wherein the CI memory further comprises:
a plurality of the CI information block memory storages, a CI index counter, a CI index counter clock generation unit, a CI access clock, and a CI access-termination bit multiplexed;
wherein the CI memory is operable to: access a single or plurality of the CI information blocks upon receiving a CI memory address;
wherein the CI memory address further comprises tag bits, index bits, and CI offset bits;
preset the CI index counter to generate an address of a CI information block memory storage;
generate an address of a CI information block memory storage by combining an index received from the CI index counter and the tag bits extracted from the CI memory address;

read a single or plurality of the CI information blocks stored at a single or plurality of the addresses of the CI information block memory storages during the CI prefetch;

write the single or plurality of the CI information blocks to a single or plurality of level of the CI caches during the CI prefetch;

receive a single or plurality of the CI memory addresses generated by a LI memory decoder when receiving a single or plurality of LIs from the LI memory during the LI prefetch;

access a single or plurality of the CI information blocks from the beginning of a basic block to the end of the basic block;

receive an initial address of the CI information block memory storage via a preset input of the CI index counter from the index bits of the CI memory address;

receive an address of the next CI information block memory storage via a clock input of the CI index counter clock generation unit, which generates a clock signal from inputs of a clock signal from the CI access clock and a signal multiplexed from the CI access-termination bits accessed from the CI information block memory storage for generating;

generate continuously an address of the next CI information block memory storage whenever receiving the clock signal from the CI index counter clock generation unit until the accessed CI access-termination bit indicates to terminate an access of the CI information block memory storage; and deliver a clock signal to the CI index counter via a clock input to update (i.e., increase or decrease) next counter value as an address of the next CI information block memory storage.

7. The apparatus of claim 2, wherein the CAL LI and CI cache system further comprises:
a single or plurality of levels of LI caches;
an LI bus; a LI cache decoder;
a LI program counter;
a single or plurality of levels of CI caches; and
a CI bus;
wherein the CAL LI and CI cache system is operable to:
fetch a single or plurality of LIs from the single or plurality of levels of the LI caches to the branch predictor via the LI bus whenever receiving a single or plurality of the LI cache addresses from the LI fetch unit or from the LI program counter; and
fetch a single or plurality of the CI information blocks from the single or plurality of levels of the CI caches to the CI fetch queue via the CI bus whenever receiving a single of plurality of CI cache addresses from the LI cache decoder receiving a single or plurality of LIs from the LI cache via the LI bus.

8. The apparatus of claim 7, wherein a CI cache further comprises:
a CI cache hit signal generation circuit;
a valid-bit evaluation circuit;
a tag comparison circuit;
a plurality of the CI cache blocks; and
a block address generation unit;
wherein the CI cache is operable to:
access a single or plurality of CI cache blocks stored in the CI cache in sequential and/or parallel whenever receiving a CI address;
generate a hit signal from the CI cache hit signal generation circuit after evaluating a valid bit accessed from the CI cache block addressed by the block address generation unit after receiving the comparison result of the tag bits from the CI address with the tag bits from the CI cache block accessed via the tag comparison circuit; wherein the CI address further comprises: tag bits, bank offset bits, set offset bits, block offset bits, and CI offset bits;

receive a preset input from one or plurality of the offset bits, including the bank offset bits, the set offset bits, the block offset bits, and/or the CI offset bits, for loading an initial block address to the block address generation unit;

continue to generate an address of the next CI block until the accessed CI access-termination bit indicates to terminate an access of the CI cache block;

access a CI information block from or to the CI bus if the CI cache hit signal is generated for reading the CI information block in sequential; otherwise, invalidate the CI cache block read;

access a plurality of the CI information blocks from the beginning of a basic block to the end of the basic block from or to the CI bus if the CI cache hit signal is generated for accessing the CI information block in parallel;

access sequentially or concurrently a single or plurality of the CI cache blocks from a plurality of the CI cache banks addressed with a plurality of the CI addresses comprising a plurality of the tag bits, a plurality of the bank offset bits, and a plurality of the set/block offset bits for prefetching and/or fetching more CI information blocks within the same or less clock cycles;

differentiate the CIs from different regions of CI main memory mapped into the CI cache block according to the value of the tag bits;

determine one of the CI cache banks according to the value of the bank offset bits;

determine one of the CI cache sets residing in the selected CI cache bank according to the value of the set offset bits;

determine one of the CI cache blocks residing in the accessed CI cache set according to the value of the block offset bits;

determine one of the CI information blocks residing in the accessed CI cache block according to the value of the CI offset bits;

eliminate the set offset bits or merge the set offset bits to the bank offset bits or the block offset bits if the CI cache does not employ any set; and eliminate the bank offset bits or merge the bank offset bits to the set offset bits or the block offset bits if the CI cache does not employ any bank.

9. The apparatus of claim 8, wherein the CI cache block further comprises:
the valid bit,
the tag bits, and
a plurality of the CI information blocks comprising a plurality of bundles of a CI access-termination bit,
a CI in-a-loop bit, and a CI;
wherein the CI cache block is operable to:
access a single or plurality of the CI information blocks stored from the organization of the CI cache block in sequential or parallel;
indicate whether or not a single or plurality of the CI information blocks stored in the CI cache block is valid according to a value of the valid bit;

differentiate the CI information blocks from different regions of the CI main memory mapped into the CI cache block according to the value of the tag bits;

access together from the valid CI cache block tagged via the CI bus if the CI cache hit signal generation circuit generates a hit signal;

read or write a single or plurality of the CI information blocks comprising the bundles of a CI access-termination bit, a CI in-a-loop bit, and a CI from or to the CI cache block addressed by the block address received from the block address generation unit;

access sequentially the CI information blocks from a plurality of the different CI cache blocks;

access a first CI information block of a basic block from the CI cache block addressed by the block address generation unit, which receives the offset bits of an initial CI address, including the bank offset bits, the set offset bits, and the block offset bits;

access continuously the next CI cache block addressed by the block address generation unit, which generates an address of the next CI information block until the current CI access-termination bit indicates to terminate an access of the next CI information block; and access a plurality of the CI information blocks from the beginning of a basic block to the end of the basic block from or to the CI bus if the CI cache hit signal is generated for parallel access.

10. The apparatus of claim 8, wherein the block address generation unit further comprises:
a clock generation circuit;
a CI access clock;
a sequential or parallel mode switch; and
a CI access-termination bit multiplexer;
wherein the block address generation unit is operable to:
load an initial block address after receiving a preset input from one or plurality of the bundles of the offset bits, including the bank offset bits, the set offset bits, the block offset bits, and/or the CI offset bits, from the block address counter;
receive a clock signal generated by the clock generation circuit with inputs from a clock signal generated by the CI access clock, a mode selection signal generated by the sequential or parallel mode switch for the sequential access or for parallel access, and a signal of the CI access-termination bit accessed from the CI cache block generated by the CI access-termination bit multiplexer;
update next counter value as an address of the next CI block by increasing or decreasing the counter value; and
generate continuously an address of the next CI block by accessing the next CI access-termination bit from the CI cache block accessed until the CI access-termination bit accessed indicates to terminate an access of the CI cache block.

11. The apparatus of claim 1, wherein the CAL frontend processor further comprises:
a branch predictor;
a CI fetch queue;
a LI/CI reorder buffer;
a LI/CI program counter;
an instruction decoder;
wherein the CAL frontend processor is further operable to:
predict whether a single or plurality of the LIs takes branches or not;
generate a single or plurality of the branch target locations of the LIs fetched in the order of the LIs fetched if the LIs are predicted to take branches;
update a branch target address predicted to the LI fetch unit and the LI prefetch unit;
receive a single of plurality of the CI information blocks from the CI cache;
determine which of the CI information blocks fetched are stored;
extract CIs from the CI information blocks fetched;
reorder the LIs and the CI information blocks before decoding the LIs and CIs;
service disrupted operations initialed by the interrupt/exception/branch misprediction service units; and
fetch the CI information blocks from the LI/CI reorder buffer or the CI fetch queue and the LIs via the branch predictor for a single or plurality of loop operations while disabling the CAL memory system in order to reduce energy consumption due to the prefetch and fetch operations in the CAL memory system.

12. The apparatus of claim 11, wherein the branch predictor is further operable to:
receive the LIs from the LI cache;
receive the LIs within a single or plurality of cycles ahead to fetch a single or plurality of the associated CI information blocks to the CI fetch queue;
receive the LIs to predict branches even before fetching a single or plurality of the CI information blocks; predict the plurality of LIs in sequence, while fetching a single or plurality of the associated CI information blocks in parallel;
receive two or more consecutive LIs from the CAL memory system in the pipelined parallel manner for limiting to fetch unnecessary CI information blocks due to the miss predicted LIs;
perform a lookahead branch prediction with a single or plurality of the LIs representing conditional branches for predicting a single or plurality of the next LI addresses while the associated CI information blocks are fetched concurrently;
discard or not fetch the LIs to the branch predictor if the LIs do not represent conditional branches;
hide a plurality of branch prediction latencies of the branch predictor to enhance the performance of a processor;
deliver the LIs predicted to the LI/CI reorder buffer for reordering the LIs and the associated CI information blocks before decoding the CIs and LIs;
not receive the LIs from a single or plurality of the LI caches if the LIs are indicated as a loop, but to reuse the LIs already fetched to and stored in the branch predictor or from the CI fetch queue for predicting branches in the loop without fetching the LIs from the CAL memory system;
iterate branch prediction with the LIs reused and reorder operation until the loop is exited;
shut down completely the CAL memory system for saving energy during the branch predictions of the LIs in the loop;
transmit a request for initiating an LI fetch to the LI fetch unit;
predict whether a single or plurality of the LIs takes branches or not;
generate a single or plurality of the branch target locations of the LIs fetched in the order of the LIs fetched if the LIs are predicted to take branches;

update the branch target address predicted to the LI fetch unit and the LI prefetch unit; and transmit the LIs predicted to the LI/CI reorder buffer for reordering the LIs and the CI information blocks before decoding the LIs and CIs.

13. The apparatus of claim 11, wherein the CI fetch queue is further operable to:

receive a single or plurality of the CI information blocks from a single or plurality of CI caches via a CI bus;

determine which of the CI information blocks fetched are stored;

forward the CI information blocks to the LI/CI reorder buffer for reordering the LIs and the CI information blocks before decoding the LIs and CIs if the LIs and the CI information blocks stored in the LI/CI reorder buffer or in the CI fetch queue are reused for the loop operation;

forward the CIs extracted from the CI information blocks to the LI/CI reorder buffer for reordering the LIs and CIs before decoding the LIs and CIs if the LIs and the CI information blocks only stored in the CI fetch queue are reused for the loop operation;

receive sequentially or concurrently a single or plurality of the CI information blocks from a single or plurality of the CI caches after or while fetching a single or plurality of the associated LIs from a single or plurality of the LI caches to the branch predictor if needed;

receive a single or plurality of the CI information blocks from a single or plurality of the CI caches via the CI bus upon receiving a single of plurality of the CI cache addresses from the LI cache decoder receiving the LIs from a single or plurality of the LI caches via the LI bus;

store temporarily the CI information blocks fetched;

forward the CIs of the CI information blocks to the LI/CI reorder buffer if all of the CIs in the loops are not stored in the LI/CI reorder buffer or the LI/CI reorder buffer only stores the CIs;

forward the CI information blocks to the LI/CI reorder buffer if all of the CI information blocks in the loops are not stored in the LI/CI reorder buffer, but stored in the CI fetch queue;

provide iteratively the CI information blocks for reorder operation along with the LIs provided from the branch predictor for saving energy during the loop operation without supplementing the complex loop buffers and the large trace buffers and without accessing the CAL memory system until a loop is exited; and reinitiate to fetch the first CI information block from the loop if both of the CI access-termination bit and the CI in-a-loop bit indicate the CI is the last CI in the loop and the next loop is predicted to be iterated.

14. The apparatus of claim 11, wherein the LI/CI reorder buffer is further operable to:

receive the LIs predicted from the branch predictor for reordering the LIs and the CI information blocks before decoding the LIs and CIs;

receive the CIs for reordering the LIs and the CIs before decoding the LIs and CIs if the CIs stored in the LI/CI reorder buffer are not reused for the loop operation;

receive the LIs from the branch predictor and the CI information blocks from the CI fetch queue;

reorder the CI information blocks and the LIs according to the sequences of the CI information blocks and the LI compiled by the BBC compiler;

store only an LI if not having any of the associated CI information block;

operate as a first-in first-out (FIFO) buffer;

update the values of pointers for reading from and writing to the LI/CI reorder buffer to the LI/CI program counter according to the number of the CIs and/or the LI in the same basic block are forwarded to the instruction decoder;

utilize the LI/CI program counter values for servicing disrupted operations initialed by the interrupt/exception/branch misprediction service units initiating a disrupted operation;

disable the CAL memory system in order to reduce energy consumption due to the prefetch and fetch operations in the CAL memory system while continuously fetching the CI information blocks from the LI/CI reorder buffer or the CI fetch queue and the LIs via the branch predictor for a single or plurality of loop operations;

fetch the CI information blocks from the CI fetch queue if all of the CI information blocks in the loops are not stored in the LI/CI reorder buffer but stored in the CI fetch queue;

fetch the CIs from the CI fetch queue if only the CIs and LIs are stored in the LI/CI reorder buffer;

access a single or plurality of values of pointers stored in the LI/CI program counter for resuming the normal operations of the CAL frontend processor after completion of the disrupted operations and for operating a single or plurality of loops without accessing the CAL memory system; and forward a single or plurality of the CIs and the LIs reordered to the instruction decoder for decoding the CIs and the LIs after extracting the CIs from the CI information blocks stored if needed.

15. The apparatus of claim 11, wherein the LI/CI program counter is further operable to:

store a single or plurality of values of pointers to access the LI/CI reorder buffer for resuming the normal operations of the CAL frontend processor after completion of the disrupted operations and for operating a single or plurality of loops without accessing the CAL memory system;

receive and store the values of pointers to read from and to write to the LI/CI reorder buffer according to the number of the CIs and/or the LI in the same basic block is forwarded to the instruction decoder; and store values for servicing disrupted operations initialed by the interrupt/exception/branch misprediction service units initiating a disrupted operation.

16. The apparatus of claim 11, wherein the instruction decoder is further operable to:

receive a single or plurality of the CIs and/or the LI reordered in the same basic block from the LI/CI reorder buffer;

receive a single or plurality of the CIs and the LIs reordered from the LI/CI reorder buffer;

decode the CIs and the LIs;

produce the decode results of the CIs and LIs; and forward the decode results to the backend processor.

17. The apparatus of claim 1, wherein the backend processor further comprises:

an interrupt/exception/branch misprediction service units;

an in-order or out-of-order single/multiple issues and execution units;

wherein the backend processor is further operable to:

receive decoded outputs from the CAL frontend processor;

execute the decoded outputs to produce the compatible results of the program compiled without the BCC compiler;
detect disrupted operation requests;
switch the normal operations of the CAL frontend processor and of the backend processor to the disrupted operations;
resume the normal operations after completion of the disrupted operations.

* * * * *